US012732824B2

(12) United States Patent
Menon et al.

(10) Patent No.: US 12,732,824 B2
(45) Date of Patent: Sep. 8, 2026

(54) LAWFUL INTERCEPT COMPLIANCE MECHANISM ON NON- TERRESTRIAL NETWORK-BASED SERVICES

(71) Applicants: AT&T Intellectual Property I, L.P., Atlanta, GA (US); AT&T Mobility II LLC, Atlanta, GA (US)

(72) Inventors: Sreejith Menon, Herndon, VA (US); Suja John, Herndon, VA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 184 days.

(21) Appl. No.: 18/650,510

(22) Filed: Apr. 30, 2024

(65) Prior Publication Data

US 2025/0338131 A1 Oct. 30, 2025

(51) Int. Cl.
*H04W 12/80* (2021.01)

(52) U.S. Cl.
CPC .................................. *H04W 12/80* (2021.01)

(58) Field of Classification Search
CPC ............................ H04W 12/80; H04L 63/306
See application file for complete search history.

(56) References Cited

U.S. PATENT DOCUMENTS

| | | | | |
|---|---|---|---|---|
| 10,756,804 | B2 * | 8/2020 | Stojanovski | H04W 88/04 |
| 2015/0200972 | A1 * | 7/2015 | Suryavanshi | H04L 63/0428 726/1 |
| 2016/0112261 | A1 * | 4/2016 | Amato | H04L 63/306 709/220 |
| 2023/0090934 | A1 * | 3/2023 | Menon | H04W 8/08 726/3 |

FOREIGN PATENT DOCUMENTS

| | | | | |
|---|---|---|---|---|
| WO | WO-2015119604 | A1 * | 8/2015 | G06F 21/552 |
| WO | WO-2023247011 | A1 * | 12/2023 | H04L 63/306 |

* cited by examiner

*Primary Examiner* — Lizbeth Torres-Diaz
(74) *Attorney, Agent, or Firm* — Guntin & Gust, PLC; Andrew Gust

(57) ABSTRACT

Aspects of the subject disclosure may include, for example, a user equipment (UE) device operative for receiving, from a local network, a mobile country code identifying a jurisdiction in which the local network is located, identifying, in a memory of the UE device, a lawful intercept modify parameter associated with the jurisdiction, receiving, based on the lawful intercept modify parameter, regulatory requirements for implementing lawful intercept procedures by the UE device, and communicating with the local network according to the lawful intercept procedures. Other embodiments are disclosed.

20 Claims, 8 Drawing Sheets

240

300

CLOUD COMPUTING ENVIRONMENTS
375
VIRTUALIZED NETWORK FUNCTION CLOUD
325
VNE
330
VNE
332
VNE
334
TRANSPORT LAYER
350
CONTENT SOURCES
175
MEDIA ACCESS
140
WIRELESS ACCESS
120
VOICE ACCESS
130
BROADBAND ACCESS
110

600

LAWFUL INTERCEPT COMPLIANCE MECHANISM ON NON- TERRESTRIAL NETWORK-BASED SERVICES

FIELD OF THE DISCLOSURE

The subject disclosure relates to a lawful intercept compliance mechanism on non-terrestrial network-based services.

BACKGROUND

As a legally sanctioned official access to private communications, lawful interception or lawful intercept (LI) is a security process in which a service provider or network operator collects and provides law enforcement officials with intercepted communications of private individuals or organizations.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for identifying a country or jurisdiction or other discernible area on which a user equipment (UE) begins operating and determining at the UE if the country corresponds to one requiring special operating procedures, such as suppression of data encryption, in order to comply with local regulations of the country. If the UE determines it is in an affected country, it queries a home network for modified operating procedures. Those are delivered from the home network to the UE, reducing the amount of message signaling required for the UE to register and begin operation on the local network while complying with the regulatory requirements of the jurisdiction. Other embodiments are described in the subject disclosure.

One or more aspects of the subject disclosure include a user equipment (UE) device operative for receiving, from a local network, a mobile country code identifying a jurisdiction in which the local network is located, identifying, in a memory of the UE device, a lawful intercept modify parameter associated with the jurisdiction, receiving, based on the lawful intercept modify parameter, regulatory requirements for implementing lawful intercept procedures by the UE device, and communicating with the local network according to the lawful intercept procedures.

One or more aspects of the subject disclosure include broadcasting a local public land mobile network (PLMN) identifier at a local network, the local PLMN identifying the local network to user equipment devices on the local network, receiving, from a user equipment (UE), an attach message, the attach message including a home PLMN identifier associated with a home network of the UE and a local regulation modification parameter, communicating a message to the home network of the UE, the message including the local regulation modification parameter, receiving, from the home network of the UE, information about regulatory requirements for the UE, and communicating the information about regulatory requirements to the UE.

One or more aspects of the subject disclosure include receiving a broadcast control message from a local network, the broadcast control message including a public land mobile network (PLMN) identifier, the PLMN identifier including a mobile country code (MCC) corresponding to a country in which the local network is operating, comparing the MCC with values stored in a memory, the values corresponding to one or more networks in countries requiring modified operation, communicating an attach message, the attach message including data indicating a match between the MCC and a value stored in the memory, the data indicating a match corresponding to a request to a home network for information about a modified operation for the country in which the local network is operating, and receiving a response, the response indicating modified operating procedures on the local network.

Figure 1:
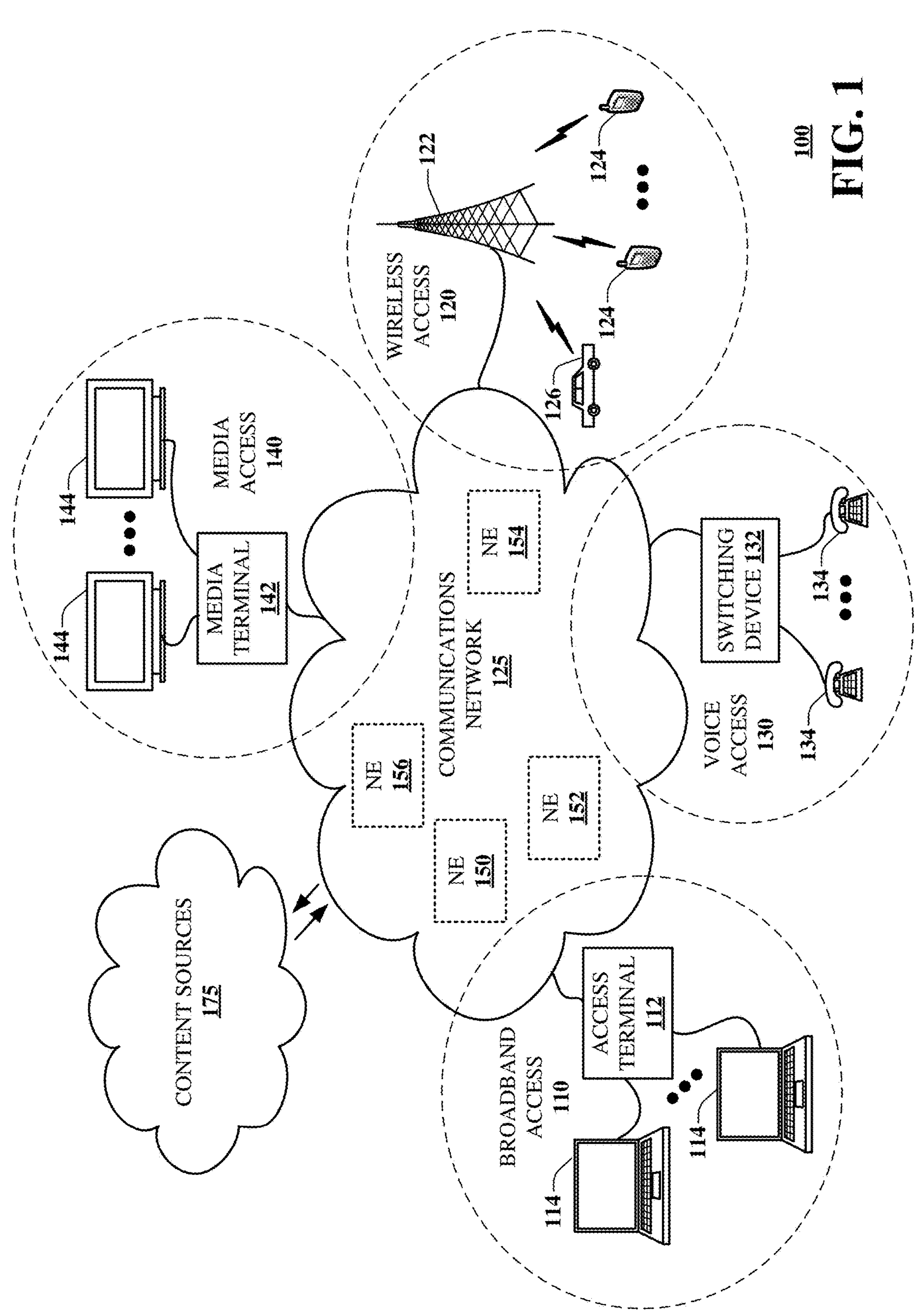
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part identifying a country or jurisdiction on which a user equipment (UE) attempts to register as a roaming device and determining at the UE if the country corresponds to one requiring special operating procedures, such as suppression of data encryption, in order to comply with local regulations of the country. If the UE determines it is attempting to register in an affected country, the UE queries a home network for modified operating procedures. Those are delivered from the home network to the UE, reducing the amount of message signaling required for the UE to register and begin operation on the local network while complying with the regulatory requirements of the jurisdiction. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
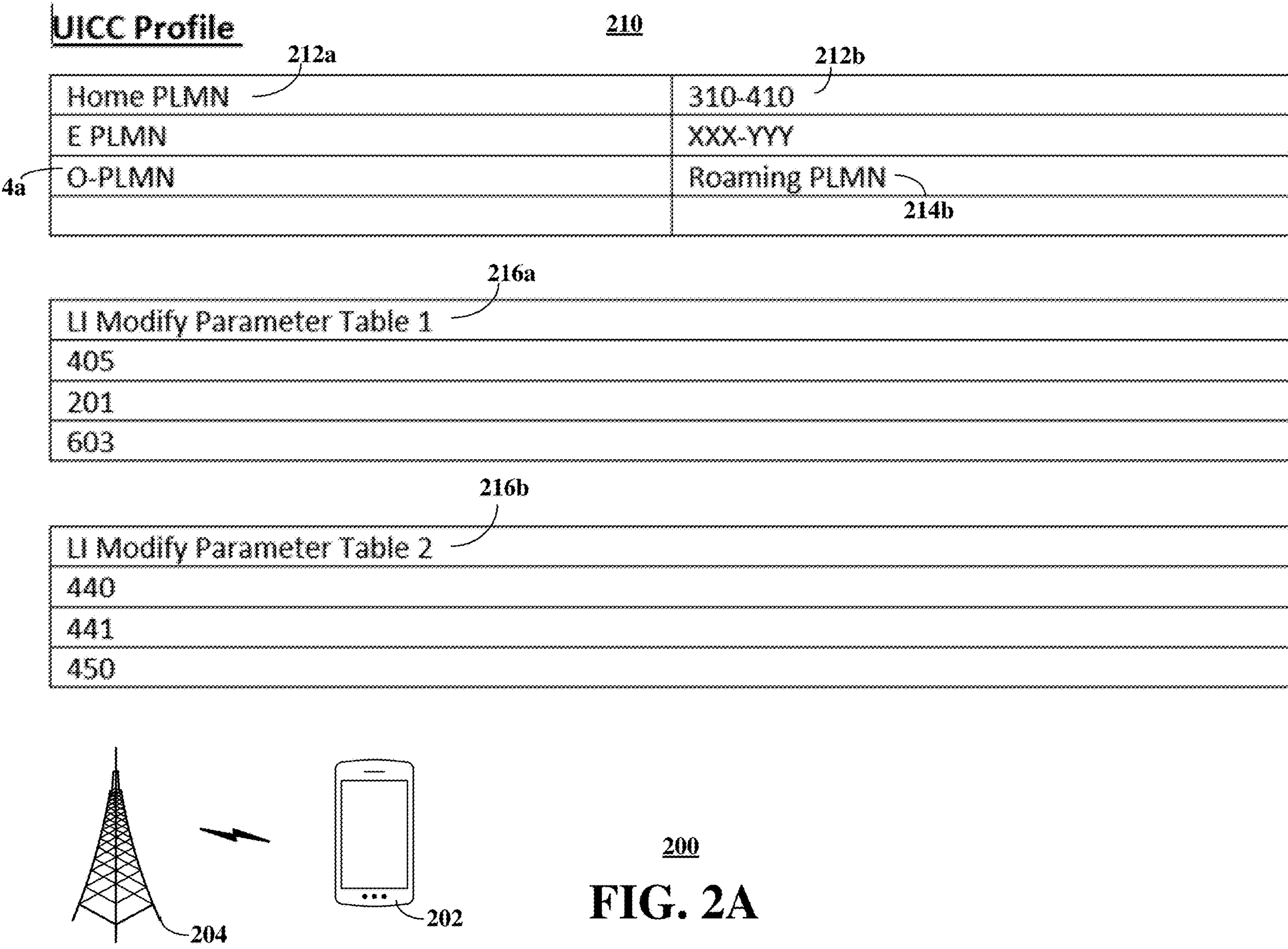
FIG. 2A is a block diagram illustrating an example, non-limiting embodiment of a user lawful intercept table for a user equipment device operating on a telecommunications system functioning within the communication network of FIG. 1 in accordance with various aspects described herein.

FIG. 2A is a block diagram illustrating an example, non-limiting embodiment of a user lawful intercept table 200 for a user equipment device operating on a telecommunications system functioning within the communication network of FIG. 1 in accordance with various aspects described herein. The user lawful intercept table 200 may be stored in the memory of a user equipment (UE) device such as UE 202 in FIG. 2A. More particularly, the user lawful intercept table 200 may be stored in a universal integrated circuit card (UICC) of the UE 202. The UICC stores information about the UE 202, a subscriber associated with the UE 202 and a subscription account associated with the UE 202. The UICC card may include a subscriber identity module (SIM) and the lawful user intercept table 200 may be stored in the SIM. In some embodiments, the UE 202 includes an embedded SIM (eSIM) and the lawful user intercept table 200 may be stored in the eSIM.

The user lawful intercept table 200 may be accessed by the UE when operating on a telecommunications network 204 including a base station as shown in FIG. 2A. The telecommunications network 204 may be part of the wireless access 120 of the communications network 125 of FIG. 1, for example. The user lawful intercept table 200 may be used to determine a response of the UE 202 when accessing the base station and network 204.

Lawful intercept or lawful interception (LI) is a major regulatory requirement for cellular operators across the world. In the United States, the Communications Assistance for law Enforcement Act (CALEA) is a statute enacted by Congress in 1994 to require that telecommunications carriers and manufacturers of telecommunications equipment design their equipment, facilities, and services to ensure that they have the necessary surveillance capabilities to comply with legal requests for information. CALEA is intended to preserve the ability of law enforcement agencies to conduct electronic surveillance while protecting the privacy of information outside the scope of the investigation. CALEA is codified at 47 U.S.C. §§ 1001-1010.

CALEA thus may refer to the facilities in telecommunication networks that allow law enforcement agencies with court orders or other legal authorization to selectively wiretap individual subscribers. This is a major regulatory requirement not only in the US but in most foreign countries. Further, the requirement may extend to non-terrestrial network services i.e., using low-earth orbit or geosynchronous orbit (LEO/GEO) satellite providers such as Starlink for providing coverage. Starlink is a trademark of Space Exploration Technologies Corp.

As different countries start formulating different regulations for lawful intercept, having a mechanism to treat roaming devices differently to meet the lawful intercept requirement of the country becomes highly important. Roaming refers to the ability for a cellular customer to automatically make and receive voice calls, send and receive data, or access other services, including home data services, when travelling outside the geographical coverage area of the home network, by means of using a visited network. Such a mechanism becomes even more critical with the introduction of non-terrestrial networks since the coverage areas become wider and wider, taking in more countries and more jurisdictions where lawful intercept is required. It has become essential that roaming devices stay compliant with lawful intercept regulations while roaming among jurisdictions. This disclosure addresses this challenge by introducing a parameter identified as LI Modify, as well as a LI Modify parameter table stored in the memory of the home network device.

As users travel or roam from one country to another, lawful intercept may become a challenge, especially if various countries have different security requirements in terms of LI. A user equipment is generally operable on a home network. The home network is a mobility network with which the user of the UE has an account. Equipment of the home network maintains records of the UE, such as a home location register (HLR). The HLR is a central database that contains details of each mobile phone subscriber that is authorized to use the mobility network.

Conventionally, when a UE or other device roams to a different country that has a different lawful intercept requirement, the device doesn't have a uniform way to treat lawful intercept. The home network associated with the UE includes an IP multimedia subsystem (IMS) core network. The IMS core network provides various services such as mobility tracking for the UE. On the home network IMS core, there are ways by which a user can enable or control encryption or no encryption of data communicated with the UE. Use of encrypted data may violate LI requirements. Further, this control of encryption is not uniform. That is, if differential treatment is required in different country or jurisdiction, the network will end up dedicating multiple network elements to perform the same. In accordance with various aspects described herein, this problem may be addressed by doing pro-active identification of the country right from the UICC and the UE or other device and addressing the LI compliance based on that information. The home network IMS core can take necessary steps based on the initiation from the UE, device, or SIM.

Conventionally, a UE such as UE 202 registered on a mobility network such as a 5G cellular network is in communication with the mobility network. The UE 202 and the mobility network exchange various control messages as well as active communications involving a subscriber of the UE 202. Such messages are generally encrypted using internet protocol version 6, also referred to as IPv6 or IP6. IP6 enables encryption of such messages to provide privacy protection and security.

Recently, different countries or jurisdictions have been developing their own sets of requirements for handling lawful intercept requests, particularly for current fifth generation (5G) cellular systems and future sixth generation (6G) and other future networks, as well as satellite based systems. For example, some countries have a requirement that signaling messages cannot be encrypted between a UE such as UE 202 and a mobility network. Legal intercept procedures in these countries exclude encryption. Other countries have other requirements of limitations when legal intercept procedures are in place, such as after issuance of a warrant.

Figure 2B:
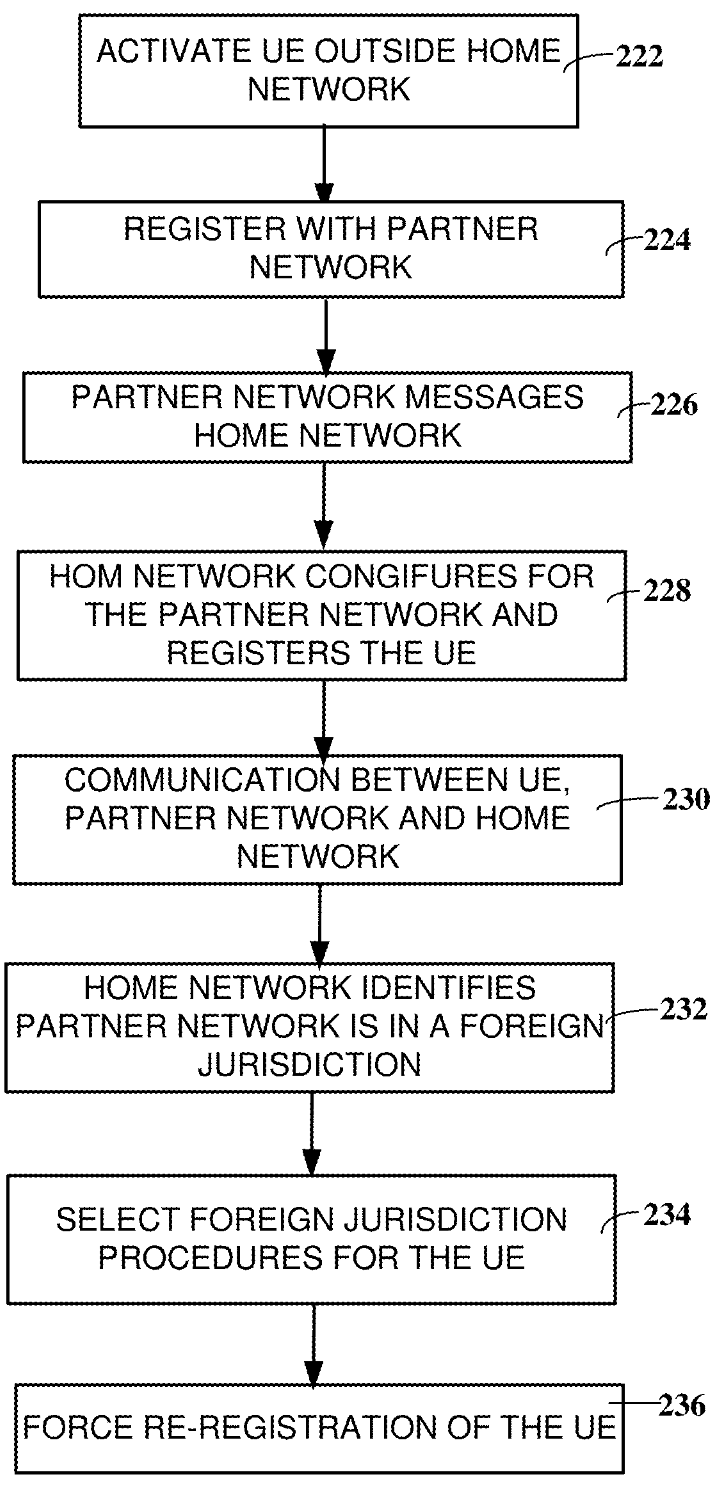
FIG. 2B depicts an illustrative embodiment of a prior art method in accordance with various aspects described herein.

FIG. 2B depicts an illustrative embodiment of a prior art method 220 in accordance with various aspects described herein. The method 220 is generally performed when a UE such as UE 202 (FIG. 2A) accesses a mobility outside its home network and home country or jurisdiction.

At step 222, the UE is activated on a network outside its home network. For example, the UE may be powered on at step 222 upon landing at an airport in the foreign country. The UE has a standard power-on routine that includes searching for a broadcast channel of any available network to initiate communication. If the identified network is a partner network of the home network, the UE may be enabled to access the partner network. For example, networks in different countries have operating agreements to enable roaming among the networks. At step 224, the UE registers with the partner network. Registration involves providing identification information and other information to enable the UE to access the partner network.

At step 226, the partner network messages the home network associated with the UE. The messaging may correspond to a verification that the UE is authorized and has an account with the home network. At step 228, the home network configures for communication by the UE with the partner network and registers the UE on the home network. For example, messages between the UE and partner network may be conveyed to the home network to provide and receive control information and for other purposes. In one example, the mobility entity of the home network may operate to control handover and other procedures in conjunction with the partner network. At step 230, communication occurs between the UE, the partner network and the home network.

At some point, the home network identifies that the partner network is in a foreign jurisdiction, step 232. Accordingly, different procedures may apply, including lawful intercept procedures. In the example, the foreign jurisdiction prohibits encryption of all communication between the partner network and all UEs operating in the foreign jurisdiction. The home network identifies this requirement at step 232, along with other relevant requirements for operation on the partner network. At step 234, the home network will select procedures and settings appropriate for the foreign jurisdiction by the UE.

At step 236, the home network operates to initiate a re-registration of the UE. For example, the home network first communicates to the partner network that it should deregister the UE on the partner network. Further, at step 236, the UE will subsequently re-register with the partner network. The user may see the UE lose signal or go blank for a brief time when the UE is no longer registered. This time, during registration between the partner network and the home network, the UE is recognized as operating on the partner network in a foreign jurisdiction. Therefore, when the registration request is received from the partner network at the home network, the procedures and settings appropriate for the foreign jurisdiction will be selected by the home network and put in place by the home network. In particular, in the example, no encryption will be used in order to comply with the legal intercept requirements of the foreign jurisdiction. The UE and the home network are now compliant with the requirements of the foreign jurisdiction.

FIG. 2B presents a relatively high-level explanation of the process of registering the UE on the foreign network according to the local legal intercept requirements. In actuality, there is a substantial negotiation between the partner network and the home network. More particularly, there are much more detailed requirements for communication between the home network and the foreign network to provide suitable authorization and compliance. Many messages may be exchanged between the UE, the home network and the foreign network in order to recognize the foreign jurisdiction, select the appropriate UE configuration and re-register the UE according to that appropriate configuration. Implementing legal intercept or other regulatory requirements can generate substantial network traffic among devices. This network traffic is highly inefficient and can reduce performance of the network.

To implement a lawful intercept requirement, the home network only needs to know the identity of the foreign jurisdiction or country and the associated legal intercept rules and requirements for that country. Accordingly, a more efficient way to implement a regulatory requirement such as legal intercept involves the UE identifying that it is activated in a foreign country or jurisdiction that has special legal intercept or other regulatory requirements. Once the UE determines that, the UE can consult a server of the home network to identify and select the appropriate rule or procedure for lawful intercept or other regulatory requirements in the identified jurisdiction. Then, within the initial device registration, the regulatory requirements such as legal intercept can be enabled or disabled based on the foreign country's requirement. If there are no special procedures or limitations for a specific country, the regular registration flow may be followed.

The mobility network may be termed a public land mobile network (PLMN). A PLMN is a combination of wireless communication services offered by a specific operator in a specific country and may be referred to as a cellular network. A PLMN is identified by a globally unique PLMN code. The PLMN code generally consists of a mobile country code (MCC) and mobile network code (MNC). The mobile country code generally consists of three decimal digits and the mobile network code generally consists of two or three decimal digits. An MCC is used in combination with an MNC to uniquely identify a mobile network operator or carrier.

The base stations of the mobility network such as network 204 broadcast a control channel or paging channel or other information including data which identifies the relevant country and network operator. In examples, this includes broadcasting the PLMN including the MCC and the MNC. As a UE such as UE 202 becomes active, the UE scans for an available network. This process is generally governed by an air interface standard such as the 5G standards published by the 3*d* Generation Partnership Project or 3GPP. The UE detects the control channel or paging channel, receives the PLMN and, in response, determines the MCC and the MNC for the mobility network.

Referring again to FIG. 2A, the UE 202 includes a UICC or SIM. An exemplary portion of the contents of a UICC of the UE 202 is illustrated as UICC profile 210. The UICC stores information about the UE 202, a subscriber associated with the UE 202 and a subscription account associated with the UE 202. Further, the UICC stores information identifying the home network associated with the UE and the account or subscription. Still further, the UE stores information about mobility networks other than the home network on which the UE is permitted to roam. For example, the operator of the home network may have roaming agreements with operators of the other mobility networks including foreign networks in foreign jurisdictions. Thus, the UICC profile 210 stores information about a home PLMN 212*a*, illustrated as PLMN identifier 212*b*. In this example, the MCC is 314 and the MNC is 410. Any other suitable examples and combinations may be used. Further, the UICC profile 210 may store information about an equivalent PLMN or E-PLMN identifier and an operator-controlled PLMN or O-PLMN identifier 214*a*. A roaming PLMN identifier 214*b* may be stored in the UICC profile to identify networks (by MCC and MNC) on which the UE may roam.

Further in the example of FIG. 2A, the UICC profile 210 stores one or more legal intercept (LI) modify parameter tables including a first LI modify parameter table 216*a* and a second LI modify parameter table 216*b*. Each LI modify parameter table stores a list of mobile country codes (MCCs) corresponding to countries that have special regulatory requirements. Lawful intercept is one such special regulatory requirement. In the example the first LI modify parameter table 216*a* stores MCCs 405, 301, 603. Similarly, the second LI modify parameter table 216*b* stores MCCs 440, 441 and 450. The mobile country codes and mobile network codes are defined by the International Telecommunication Union Telecommunication Standardization Sector (ITU-T). The MCCs and MNCs are uniquely assigned to a country and network operator, respectively, and uniquely identify a respective country and a respective network or network operator. In other embodiments, where a categorization other than a country or legal jurisdiction is key to determining how a situation should be handled by the UE 202 or the network 205, the UICC profile 210 may store other parameters in tables similar to the LI modify parameter tables.

Figure 2C:
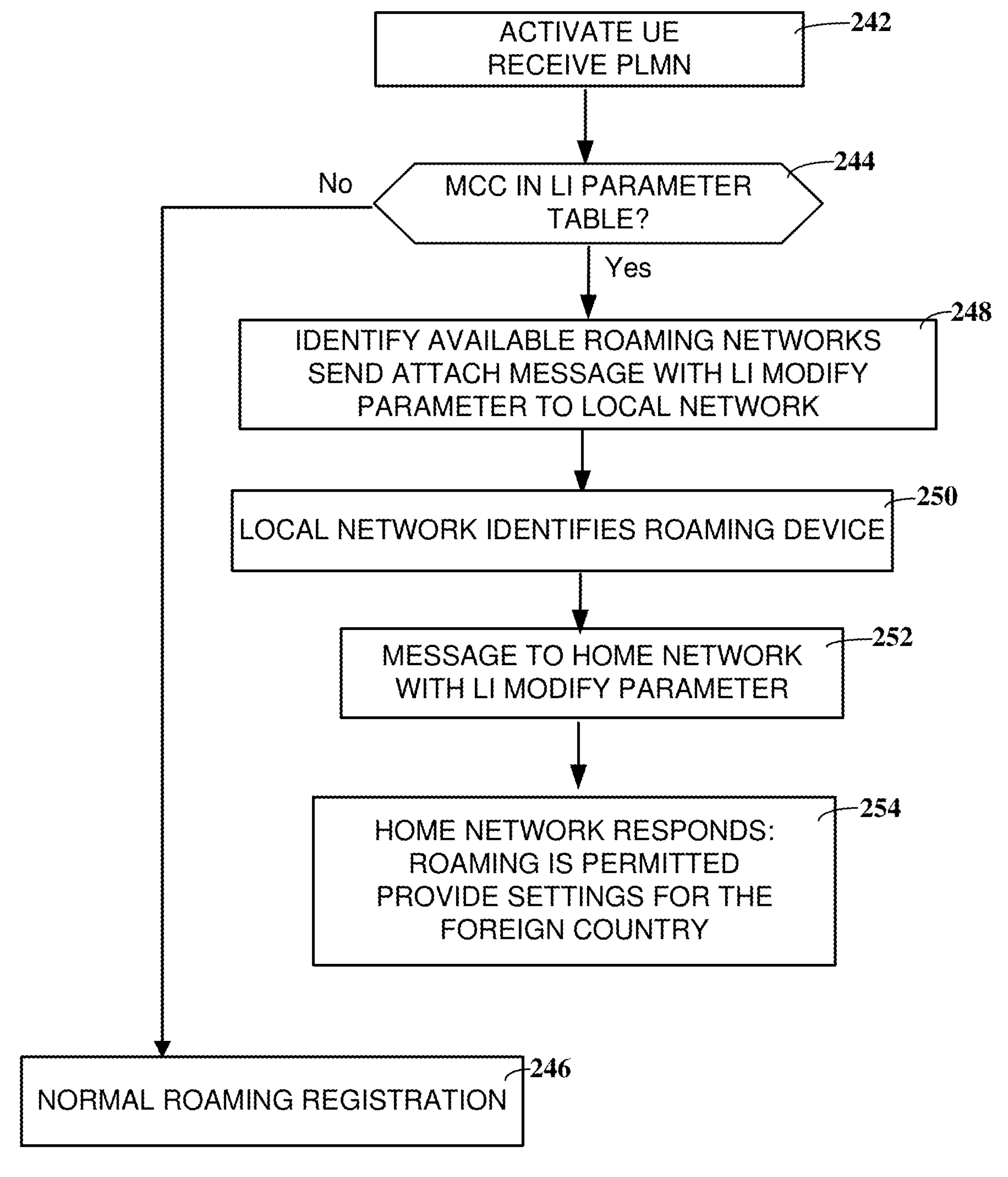
FIG. 2C depicts an illustrative embodiment of a method in accordance with various aspects described herein.

FIG. 2C depicts an illustrative embodiment of a method 240 in accordance with various aspects described herein. The method 240 may be initiated when a UE device attempts to access a mobility network as a roaming device, and the mobility network is located in a country different from the country where the subscriber's home network is located. In an example, the subscriber and the UE have arrived at an airport in in the foreign country. The subscriber turns on the UE which attempts to access the local mobility network.

At step 242, the UE is activated. In an example, the UE is powered up and begins the process of attaching to the network. For example, the UE searches for and receives a control channel broadcast by a base station of the local network. Also at step 242, in the control channel or other information from the local network, the UE receives a PLMN. The PLMN includes a variety of information including a mobile country code (MCC) corresponding to the country where the user and mobile network are located as well as a mobile network code (MNC) corresponding to the mobile network.

At step 244, the UE determines if the MCC is in the LI parameter table stored in the UE. In some embodiments, the LI parameter table is stored in the UICC or SIM of the UE. In other cases, information of the UICC is stored in working memory of the UE itself. For example, some UE devices use an embedded SIM (e-SIM) located in the working memory of the UE, rather than on a removeable SIM card or other device. If no SIM is provided, or for any other suitable reason, the LI parameter table may be stored in the memory of the UE. The UICC or SIM generally includes information such as identification of the UE's home network and PLMN identifiers for networks on which the UE is authorized to roam. As indicated, this information, along with the LI parameter table, may be stored in any suitable location.

In embodiments, the LI parameter table may be stored or updated at any suitable time. For example, when the subscription account is provisioned, the UICC may be written with information such as the home PLMN, roaming PLMNs and the LI modify parameters. From time to time, as there are updates to regulatory requirements, the LI modify parameters may be updated. For example, updates can occur when the UE registers with the home network, or on a periodic basis. In general, the network operator of the home network may be responsible for keeping current with legal intercept and other regulatory requirements and updating LI modify parameters in respective UE devices.

The LI parameters may be stored in any suitable location or format. In the illustrated embodiment, the LI parameters are stored in a table format, with each table including a set or series of mobile country codes requiring special processes. When the UE receives PLMN information from a local network and identifies the MCC, the UE looks for a match among the stored LI parameters. If there is a match, the UE uses the MCC to inform a server at the home network about the country code and the jurisdiction where the UE is located and to receive in response information about special handling. One example is inhibition of encryption of voice calls as required by lawful intercept regulations.

In the example of FIG. 2A, LI modify parameters are stored in different tables. Each table or group of LI modify parameters may correspond to a different set of special processes for a UE. For example, the MCCs stored in the first LI modify parameter table 216*a* may define countries in which encryption of communications involving the UE are prohibited. Further in this example, the MCCs stored in the second LI modify parameter table 216*b* may define countries in which only partial encryption is required. In addition to encryption, any other process or call handling may be defined by or associated with the modify parameters stored at the UE.

If, at step 244, the MCC for the country is not present in the LI parameter table, then no special handling or processing requirements are in place for this country for this UE. In that case, control proceeds to step 246 and a normal roaming registration occurs. The presence of the MCC in the LI parameter table forms a signal to the UE that special handling requirements are in place for this country. In the example, the special handling requirements relate to lawful intercept regulations imposed by the local jurisdiction. For example, to enable and comply with lawful intercept regulations, no encryption of messaging between the home network and the roaming network may be permitted. If at step 244, the MCC for the country is stored in the LI parameter table, the UE initiates a process to attach to the local network as a roaming device on the local network.

At step 248, the UE identifies any roaming networks available to the UE. For example, at step 242, the UE may receive multiple PLMNs from multiple network operators, each PLMN defining an available mobility network in the country. However, the home network associated with the UE may have roaming agreements with only a single PLMN in the country or the location. The information stored in the UE, such as in the UICC profile 210 of FIG. 2A, defines one or more PLMNs which the UE may access as a roaming network.

Further at step 248, the UE formats an attach message to send to the local network. In general, the UE performs whatever steps are required by the air interface standard (such as the 5G standard) to request access to the local network. This may include identifying the UE and identifying the home network with which the UE is associated. The UE may be identified by, for example, an international mobile subscriber identifier (IMSI) uniquely assigned to the UE or the subscriber, or by any other technique. Similarly, the home network may be identified by the PLMN identifier associated with the home network, or any other suitable technique.

In the example, the UE also includes an LI modify parameter value in the attach message communicated to the local network. The LI modify parameter value may be any suitable data that may form an indicator to the UE's home network that the UE is seeking to attach to a mobility network in a foreign country. Moreover, the LI modify parameter may be a value that uniquely identifies the foreign country or jurisdiction. In the example, the UE detects a match between the MCC of the PLMN received from the local network and one of the MCC values or LI modify parameter values stored in the UICC or the UE. The UE reads the LI modify parameter from the UICC and includes the LI modify parameter in the attach message or any other suitable communication to the local network. Current network messaging may be modified to accommodate communication of the LI modify parameter or additional messaging may be defined for the roaming UE accessing the local network.

At step 250, the local network receives the attach message from the UE. Based on the home network information included in the attach message, the local network identifies the UE as a roaming device. That is, if the PLMN identifying the home network of the UE does not match the PLMN identifier of the local network, the UE device is considered a roaming device. Operations by the local network may be performed at any suitable location in the network such as a mobility management entity or other server located in a core network of the local network. Further, the local network identifies the home network based on the PLMN information of the UE.

In response to identifying the UE device as a roaming device, the local network determines if the home network of the UE has a roaming agreement with the local network. If not, the attach request may be denied by the local network. If there is a roaming agreement or if the UE is otherwise authorized to operate on the local network, the local network sends a message to the home network, step 252. The message to the home network operates as an inquiry whether the UE can roam on the local network. Moreover, the message to the home network includes the LI modify parameter received from the UE.

At step 254, the home network determines if the subscriber and the UE are authorized to roam on the local network. For example, the subscriber's subscription may permit or prohibit roaming or roaming to that particular country. Further, the home network receives the LI modify parameter from the local network and determines if there are any lawful intercept regulations or other regulatory limitations in place for the UE or the subscriber on the local network in the foreign jurisdictions. The home network responds with information about roaming authorization and regulatory requirements. For example, the home network may provide to the local network information that the UE is prohibited from using encryption in the foreign country due to lawful intercept requirements. This information is relayed by the local network to the UE as the UE and local network begin a data session.

As noted, the LI modify parameters and other such information may be stored at the UE, such as in the UICC or in the working memory of the UE. In addition, the information about the regulatory parameters for each country, such as the requirement excluding encryption, may be stored locally at the UE as well, either in the UICC or in the working memory. In that example, the UE receives the PLMN from the local network, identifies the MCC for the country and the retrieves from its own memory the necessary regulatory information. The UE keeps the required regulatory information locally, rather than receiving from the home network during attachment to a local network when roaming. The parameters can then be routinely updated, such as when there is a change to the parameters or when the UE registers with the home network. An over the air update may be transmitted to the UE at any appropriate time. The decision of where to locate the country-specific requirements may be made based on any suitable information such as how much information must be stored for how many countries and the difficulty of updating information in enough time to be useful at the UE. Further, if the regulatory requirement information requires substantial processing, it may be better located at a server or edge cloud processor with more substantial processing power than the UE. Alternatively, locating the regulatory requirement information at the UE may provide faster verification and response when attaching to a local network as a roaming device.

The processes and techniques described herein in connection with lawful intercept regulations may be extended to many other types of information and operation. For example, control and operation of autonomous vehicles may be heavily regulated in some areas. Moreover, the regulations may vary among jurisdictions or locations. Such vehicles require telecommunications networks for operation and intercommunication, such as by using vehicle to anything (V2X) messaging. In such an application, the communication devices of the vehicles may identify the local country and the local network from the PLMN received from the network. The MCC and MNC may be used to identify and receive at the vehicle localized regulatory requirements for V2X operation of the vehicle.

Accordingly, when a UE or other device scans the local network for the PLMN that is being broadcasted on the radio access network (RAN), the device will map the MCC that it sees to the MCC that the LI Modify parameter table stores in the UICC or other memory location. If the MCC (mobile country code) matches that of the LI Modify parameter table, then this triggers the UE to take the necessary action.

In an example, if country 1 has a LI requirement that states that there should be no data encryption on Voice over LTE (VOLTE) calls that are made in country 1, for LI purposes. Then, in this example, a carrier based in country 2 will update the subscriber's UICC/SIM "LI Modify parameter" table with the MCC of country 1, for example, 405. This will ensure that anytime this device or subscriber travels to country 1, when it scans for the PLMN and when the device sees 405 MCC broadcasted by the local network and it matches with the LI Modify parameter in the device's UICC, the match will trigger the device to negotiate a No encryption based handshake with the carrier's (in country 2) IP Multimedia Subsystem (IMS) core network for the VOLTE call. This will ensure that the device meets the regulatory obligation of country 1.

Thus, in accordance with various features described herein, lawful intercept parameters may be stored in a table in a UICC or SIM or memory of a UE device. Information received from the device, such as a PLMN, MCC or MNC, may be used to identify a relevant jurisdiction. Further, the device itself can directly query for LI or other regulatory information. This can reduce the number of messages conveyed between the UE, a local network on which the UE seeks to roam and the home network.

Moreover, this solution ensures a uniform way to address various LI regulatory requirements of various countries by maintaining the LI modify parameter table in the UICC and use of a new signaling message to indicate LI modify action from the device to home network. This ensures that the UICC can be easily updated (e.g., the LI modify parameter table) based on the roaming rate plan that is attached to the device subscription. The device can proactively figure out the actions to take in that country and reduces the capital cost of dedicating separate IMS network functions to do separate functions to meet this regulatory requirement.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
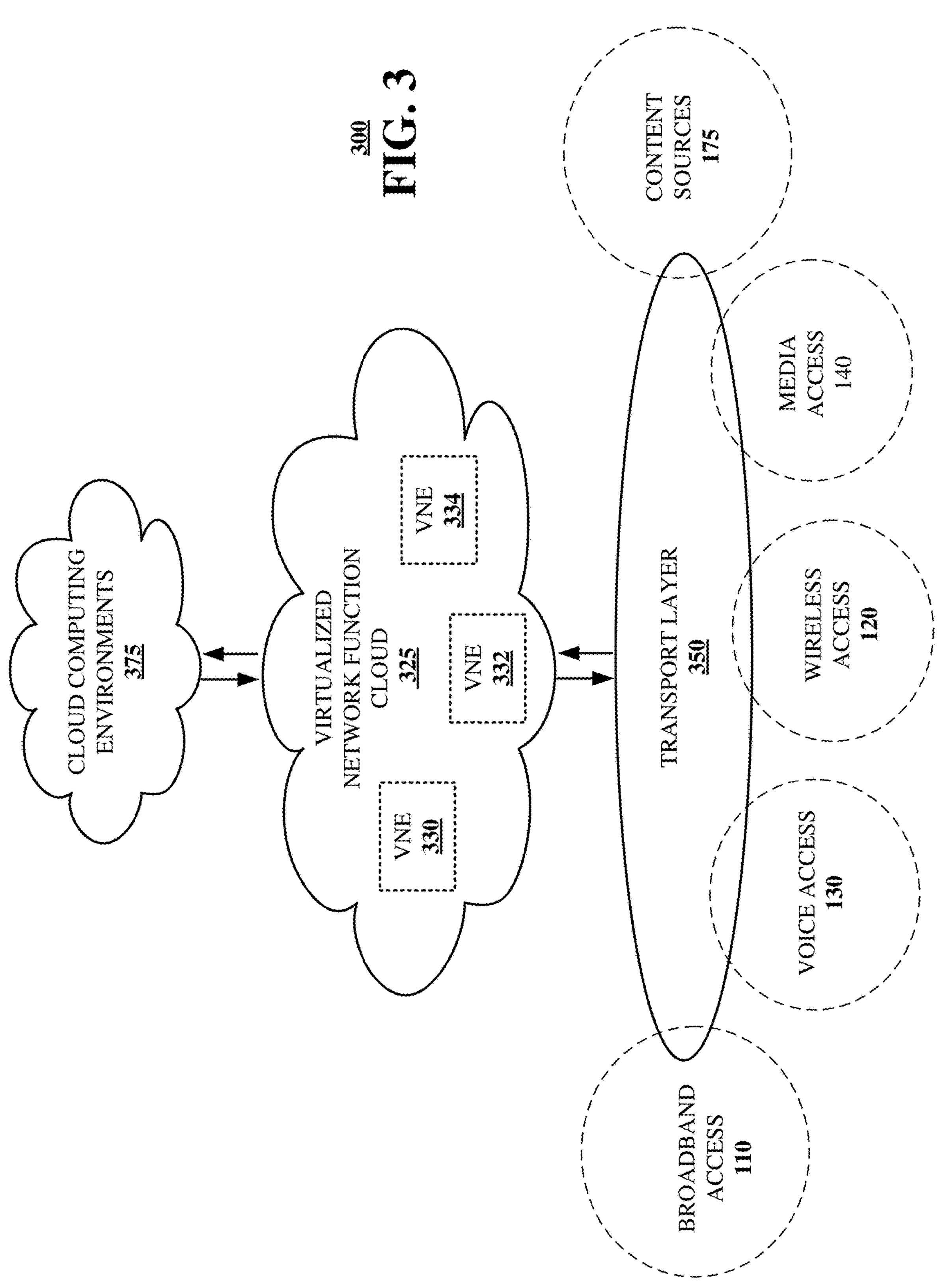
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network in accordance with various aspects described herein. In particular a virtualized communication network 300 is presented that can be used to implement some or all of the subsystems and functions of system 100, the subsystems and functions of a user lawful intercept table 200 for a user equipment device operating on a telecommunications system, and method 240 presented in FIG. 1, FIG. 2A, FIG. 2C, and FIG. 3. For example, virtualized communication network 300 can facilitate in whole or in part identifying a country or jurisdiction on which a user equipment (UE) attempts to register as a roaming device and determining at the UE if the country corresponds to one requiring special operating procedures, such as suppression of data encryption, in order to comply with local regulations of the country. If the UE determines it is attempting to register in an affected country, the UE queries a home network for modified operating procedures. Those are delivered from the home network to the UE, reducing the amount of message signaling required for the UE to register and begin operation on the local network while complying with the regulatory requirements of the jurisdiction.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
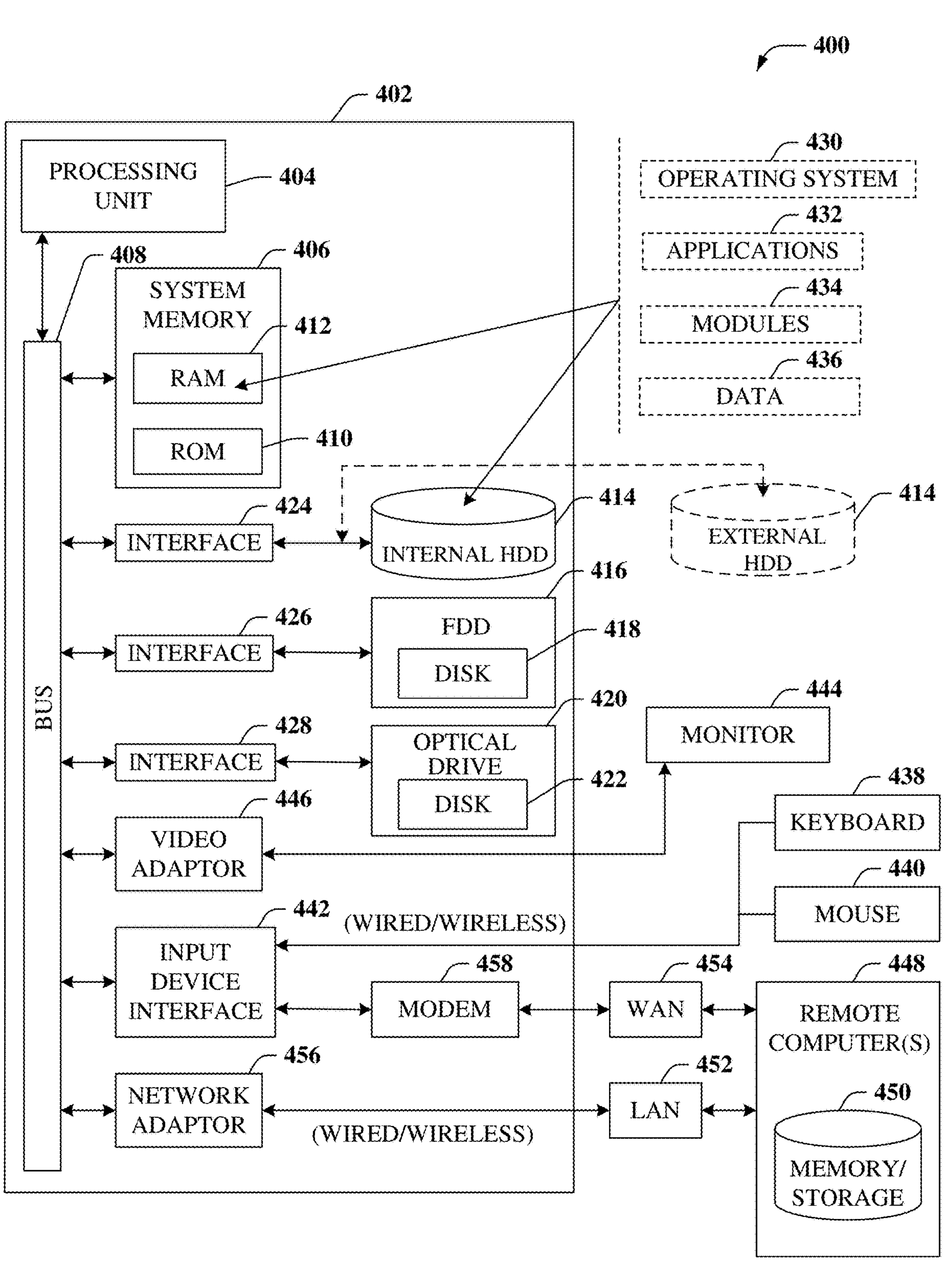
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part identifying a country or jurisdiction on which a user equipment (UE) attempts to register as a roaming device and determining, based on information stored in memory at the UE, if the country corresponds to one requiring special operating procedures, such as suppression of data encryption, in order to comply with local regulations of the country. If the UE determines it is attempting to register in an affected country, the UE queries a home network for modified operating procedures. Those are delivered from the home network to the UE, reducing the amount of message signaling required for the UE to register and begin operation on the local network while complying with the regulatory requirements of the jurisdiction.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are examples and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
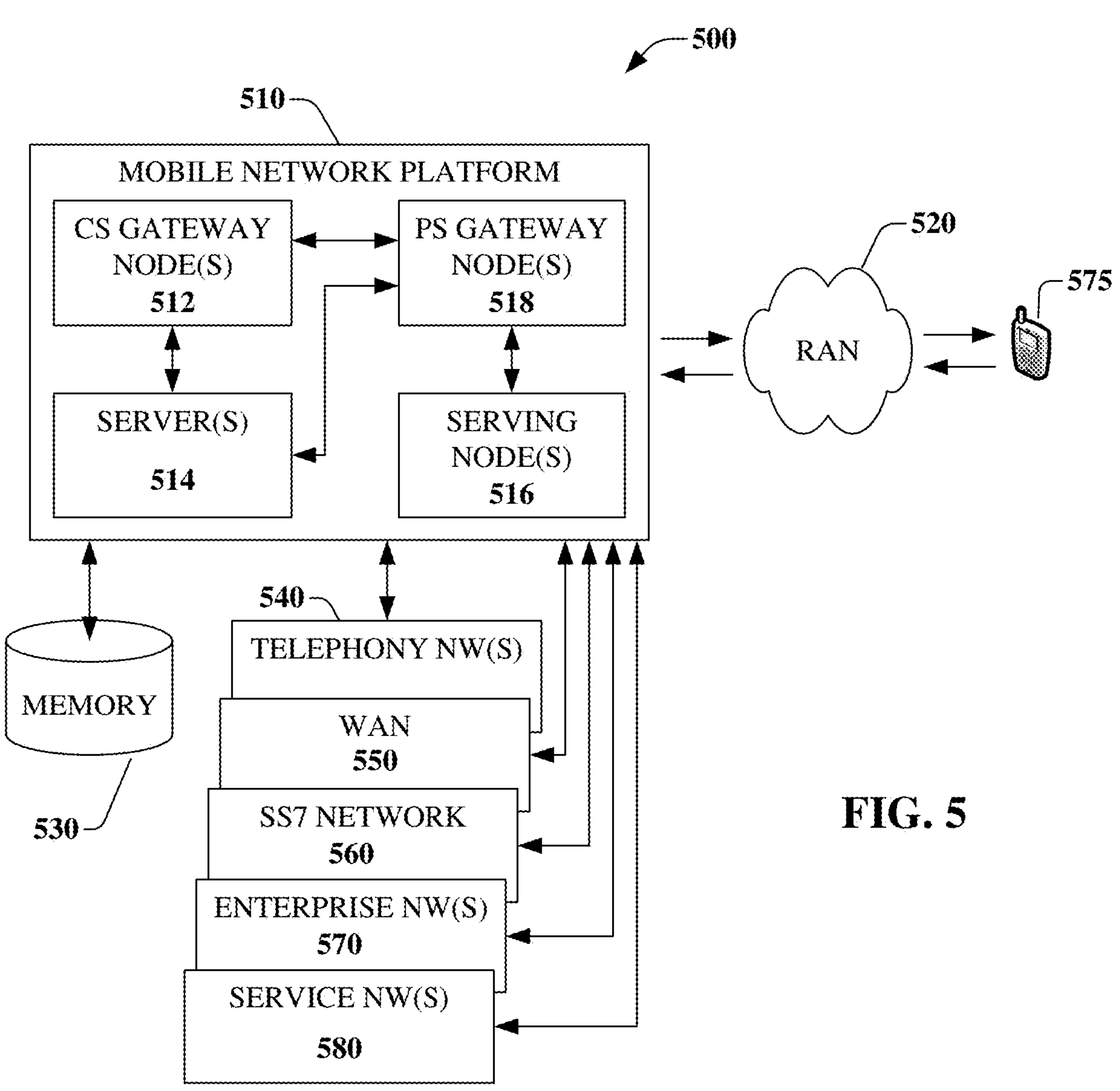
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part identifying a country or jurisdiction on which a user equipment (UE) attempts to register as a roaming device and determining at the UE if the country corresponds to one requiring special operating procedures, such as suppression of data encryption, in order to comply with local regulations of the country. If the UE determines it is attempting to register in an affected country, the UE queries a home network for modified operating procedures. Those are delivered from the home network to the UE, reducing the amount of message signaling required for the UE to register and begin operation on the local network while complying with the regulatory requirements of the jurisdiction. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
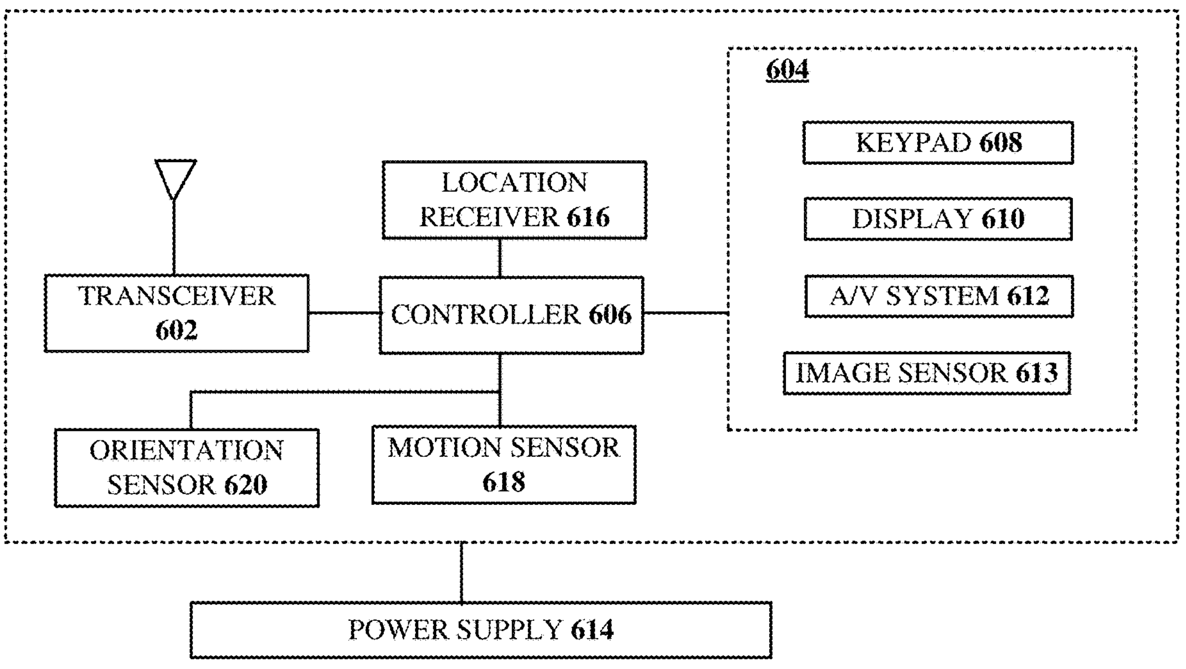
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part identifying a country or jurisdiction on which a user equipment (UE) such as the communication device 600 attempts to register on a network as a roaming device and determining at the UE if the country corresponds to one requiring special operating procedures, such as suppression of data encryption, in order to comply with local regulations of the country. If the UE determines it is attempting to register in an affected country, the UE queries a home network for modified operating procedures. Those are delivered from the home network to the UE, reducing the amount of message signaling required for the UE to register and begin operation on the local network while complying with the regulatory requirements of the jurisdiction.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, X=(x1, x2, x3, x4, . . . , xn), to a confidence that the input belongs to a class, that is, f (x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A user equipment (UE) device, comprising:

a processing system including a processor; and a memory that stores executable instructions that, when executed by the processing system, facilitate performance of operations, the operations comprising:

receiving, from a local network, information about a jurisdiction in which the local network is located;

identifying, in the memory, a lawful intercept modify parameter associated with the jurisdiction;

communicating, to the local network, an attach message, the attach message including the lawful intercept modify parameter, the information about the jurisdiction, and information about a home network with which the UE device is associated;

receiving, from the home network over the local network, based on the lawful intercept modify parameter, regulatory requirements for implementing lawful intercept procedures by the UE device; and communicating with the local network according to the lawful intercept procedures.

2. The UE device of claim 1, wherein the information about the jurisdiction comprises a mobile country code.

3. The UE device of claim 2, wherein the operations further comprise:

identifying a match between the mobile country code and a lawful intercept modify parameter values stored in the memory; and initiating a negotiation with an IP Multimedia Subsystem of a home network with which the UE device is associated so that call confidentiality data authentication is unencrypted for calls between the UE device and the local network.

4. The UE device of claim 2, wherein the identifying the lawful intercept modify parameter associated with the jurisdiction comprises:

comparing the mobile country code with lawful intercept modify parameter values in a universal integrated circuit card (UICC) or a subscriber identity module (SIM) of the UE device.

5. The UE device of claim 2, wherein the identifying the lawful intercept modify parameter associated with the jurisdiction comprises:

comparing the mobile country code with lawful intercept modify parameter values in a working memory portion of the UE device.

6. The UE device of claim 1, wherein the receiving the regulatory requirements comprises:

receiving an indication to omit data encryption when communicating with the local network according to the lawful intercept procedures of the jurisdiction.

7. The UE device of claim 1, wherein the operations further comprise:

receiving, from the home network, a set of lawful intercept modify parameters including the lawful intercept modify parameter, wherein each lawful intercept modify parameter of the set of lawful intercept modify parameters corresponds to a respective jurisdiction of a set of jurisdictions with established regulatory requirements for implementing lawful intercept procedures by UE devices including the UE device.

8. The UE device of claim 7, wherein the operations further comprise:

updating, with information from the home network, the set of lawful intercept modify parameters, wherein the updating reflects changes to one or more established regulatory requirements for implementing lawful intercept procedures by UE devices.

9. The UE device of claim 8, wherein the updating is based on a roaming rate plan associated with a subscription for service of the UE device.

10. The UE device of claim 7, wherein the operations further comprise:

receiving, from the home network, a second set of modify parameters, wherein respective parameters of the second set of modify parameters correspond to a respective jurisdiction of a second set of jurisdictions with established regulatory requirements for managing communication procedures by UE devices including the UE device.

11. A non-transitory machine-readable medium, comprising executable instructions that, when executed by a processing system including a processor, facilitate performance of operations, the operations comprising:

broadcasting a local public land mobile network (PLMN) identifier at a local network, the local PLMN identifying the local network to user equipment devices on the local network;

receiving, from a user equipment (UE), an attach message, the attach message including a home PLMN identifier associated with a home network of the UE and a local regulation modification parameter;

communicating a message to the home network of the UE, the message including the local regulation modification parameter;

receiving, from the home network of the UE, information about regulatory requirements for the UE; and communicating the information about regulatory requirements to the UE.

12. The non-transitory machine-readable medium of claim 11, wherein the receiving information about regulatory requirements comprises:

receiving information to suppress data encryption for communication between the UE and the local network according to regulatory requirements of a jurisdiction in which the local network is located.

13. The non-transitory machine-readable medium of claim 11, wherein the operations further comprise:

broadcasting a mobile country code (MCC) corresponding to a jurisdiction in which the local network is located; and receiving, from the UE, the MCC as the local regulation modification parameter upon a match of the MCC with an entry stored in a memory of the UE.

14. The non-transitory machine-readable medium of claim 11, wherein the receiving the attach message comprises:

receiving, from the UE, the local regulation modification parameter as an indicator that the UE is operating in a jurisdiction indicated by the local PLMN identifier and should modify UE operation according to the jurisdiction indicated by the local PLMN identifier.

15. The non-transitory machine-readable medium of claim 14, wherein the receiving the information about regulatory requirements for the UE comprises:

receiving, from the home network, information that the UE is prohibited from data encryption in the jurisdiction.

16. The non-transitory machine-readable medium of claim 11, wherein the operations further comprise:

registering the UE on the local network according to information about regulatory requirements for the UE.

17. A method, comprising:

receiving, by a processing system including a processor, a broadcast control message from a local network, the broadcast control message including a public land mobile network (PLMN) identifier, the PLMN identifier including a mobile country code (MCC) corresponding to a country in which the local network is operating;

comparing, by the processing system, the MCC with values stored in a memory, the values corresponding to one or more networks in countries requiring modified operation;

communicating, by the processing system, an attach message, the attach message including data indicating a match between the MCC and a value stored in the memory, the data indicating a match corresponding to a request to a home network for information about a modified operation for the country in which the local network is operating; and receiving, by the processing system, a response, the response indicating modified operating procedures on the local network.

18. The method of claim 17, wherein the receiving a response comprises:

receiving, by the processing system, information from the home network indicating that data encryption is prohibited in the country in which the local network is operating.

19. The method of claim 17, comprising:

initiating, by the processing system, a normal roaming registration with the local network in response to a determination of no match between the MCC and any value stored in the memory.

20. The method of claim 17, comprising:

communicating, by the processing system, with the local network according to the modified operating procedures.

* * * * *